United States Patent
Wang

[19]

[11] Patent Number: 6,038,333
[45] Date of Patent: *Mar. 14, 2000

[54] PERSON IDENTIFIER AND MANAGEMENT SYSTEM

[75] Inventor: John Y. A. Wang, Mountain View, Calif.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/039,990

[22] Filed: Mar. 16, 1998

[51] Int. Cl.⁷ .................................................. G06K 9/00
[52] U.S. Cl. ........................................ 382/118; 382/313
[58] Field of Search .................................... 382/115, 116, 382/118, 313, 321, 324, 124, 125, 126, 127; 707/6, 9; 348/150, 151, 156, 158; 356/71; 395/186; 340/825.34

[56] References Cited

U.S. PATENT DOCUMENTS

| | | | |
|---|---|---|---|
| 4,582,985 | 4/1986 | Lofberg | 235/380 |
| 4,993,068 | 2/1991 | Piosenka et al. | 380/23 |
| 5,164,992 | 11/1992 | Turk et al. | 382/2 |
| 5,224,173 | 6/1993 | Kuhns et al. | 382/116 |
| 5,450,504 | 9/1995 | Calia | 382/118 |
| 5,550,928 | 8/1996 | Lu et al. | 382/116 |
| 5,553,155 | 9/1996 | Kuhns et al. | 382/115 |
| 5,701,770 | 12/1997 | Cook et al. | 70/63 |
| 5,844,547 | 12/1998 | Manakuchi et al. | 345/173 |
| 5,852,670 | 12/1998 | Setlak et al. | 382/126 |
| 5,880,783 | 3/1999 | Ma | 348/373 |
| 5,898,600 | 4/1999 | Isashi | 364/705.01 |

FOREIGN PATENT DOCUMENTS

WO 98/03966A2  1/1998  WIPO ............................ G06K 9/46

OTHER PUBLICATIONS

Rowley et al., "Human Face Detection in Visual Scenes", 1995, Carnegie Mellon Computer Science Tech. Report CMU–CS–95–158R.

Primary Examiner—Leo H. Boudreau
Assistant Examiner—Brian P. Werner
Attorney, Agent, or Firm—Thomas X. Li

[57] ABSTRACT

A person identifier and management system is described. The person identifier and management system includes a face image database that stores the face feature data of each of a number of face images and the person-identifying data associated with each of the face images. A camera is also included in the person identifier and management system for capturing an input face image. A face analysis system is then coupled to the camera and the image database to extract the face feature data of the input face image and to compare the face feature data of the input face image with that of each of the face images stored in the database such that the person-identifying data of any stored face image similar to the input face image can be retrieved from the image database. A method of retrieving person-identifying information of an input face image from a face image database is also described.

7 Claims, 7 Drawing Sheets

FRONT VIEW

PERSON IDENTIFIER AND MANAGEMENT SYSTEM

BACKGROUND OF THE INVENTION

1. Field of the Invention

The present invention pertains to image processing and information management. More particularly, this invention relates to a person identifier and management system that can retrieve person-identifying information from a database based on an input face such that the input face can be identified.

2. Description of the Related Art

As is known, human nature typically shows that people want to be recognized by others. Thus, it is important for people to recognize and recall the names of other people they have previously met or acquainted during meetings, social functions, or other occasions. Not recognizing the person before you may affect you adversely. For example, if a superior or employer does not recognize or cannot recall the name of an inferior or employee, it may give the inferior/employee the impression that the supervisor/employer does not care about the inferior/employee, or the inferior/employee is not important in the organization. In addition, if a business person cannot recognize or recall the name of a business counterpart from another organization, it may affect the business dealing or potential business dealing with the organization that business counterpart represents.

However, for people who have a relatively large number of casual acquaintances, association of faces with names is a difficult memory game. In addition, some people are just not good at recognizing or recalling names of formal acquaintances, especially when the formal acquaintances have only been briefly introduced to you. Change of environment may also cause problems for people to recognize or recall names of others. For example, a person will have more difficulty in recognizing people initially if the person is surrounded by a large number of strangers (e.g., in a new office building).

With the advance of computer and image processing technologies, it is now possible to store an image in a computer system. This can be done using a digital camera to capture an image. In addition, a scanner can be used to convert a printed image into digital form. The digital image includes image pixels (or dots) arranged in a matrix. The data for each image pixel are then stored in the computer. The digital image can be retrieved for display from the computer.

This allows a face image database to be built in a computer system that can help the user to manage the acquaintances' information. The face image database typically stores a number of face images and the person-identifying information associated with each of the stored images. The person-identifying information is typically a text information that identifies the face. The person-identifying information in text format may include name, contact information, date and occasion of last meeting or all the prior meetings. When the user retrieves a face image from the database, the person-identifying information associated with that image is also retrieved from the database. When the person-identifying information is displayed with the associated face image, the user can then recognize the face and recall the name of the face.

However, searches within this face image database is still nearly impossible. In order to identify a desired face image stored in the computer based on an input face image, the prior art typically causes the computer to compare the image pixel data of the input face image with the corresponding pixel data of each of the images stored in the computer. The comparison typically takes a very long time to complete and uses a lot of system resources (e.g., memory and communication bandwidth). This is because the computer has to compare each image pixel data of the input face image with the corresponding image pixel data of each of the stored face images. A match occurs when each pixel data of the input face image is similar the corresponding pixel data of a stored face image. Using this method, unless the two compared images are extremely similar, it is very difficult to find a match between any two face images. This is especially true because noise and other positional errors may be introduced into the image data when the input face image is captured.

SUMMARY OF THE INVENTION

One feature of the present invention is to help a user recall or recognize people the user has previously met.

Another feature of the present invention is to allow retrieval of personal-identifying information from a database in accordance with an input face image.

A farther feature of the present invention is to provide a person identifier and management system that searches for similar faces of an input face in a face image database such that person-identifying information associated with the similar faces can be retrieved from the database to identify the input face.

A still further feature of the present invention is to provide a personal person identifier and management system that is portable, personal, and easy to use.

A person identifier and management system is described. The person identifier and management system includes an image database that stores face feature data of each of a number of face images and person-identifying data associated with each of the face images. An image capturing system is also included for capturing an input face image. A face analysis system is then coupled to the image capturing system and the image database to locate and retrieve the person-identifying data of any stored face image similar to the input face image from the image database. The face analysis system does this by, for example, extracting the face feature data of the input face image and comparing the face feature data of the input face image with that of each of the face images stored in the database.

A method of retrieving person-identifying information from a face image database based on an input face image includes the step of extracting face feature data from the input face image. The face feature data of the input face image is then compared with that of a number of face images stored in the database. Each of the stored face images includes the person-identifying information that identifies the respective face image. If the face feature data of one of the stored face images matches that of the input face image, then the person-identifying information of that stored face image is retrieved from the image database to identify the input face image.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
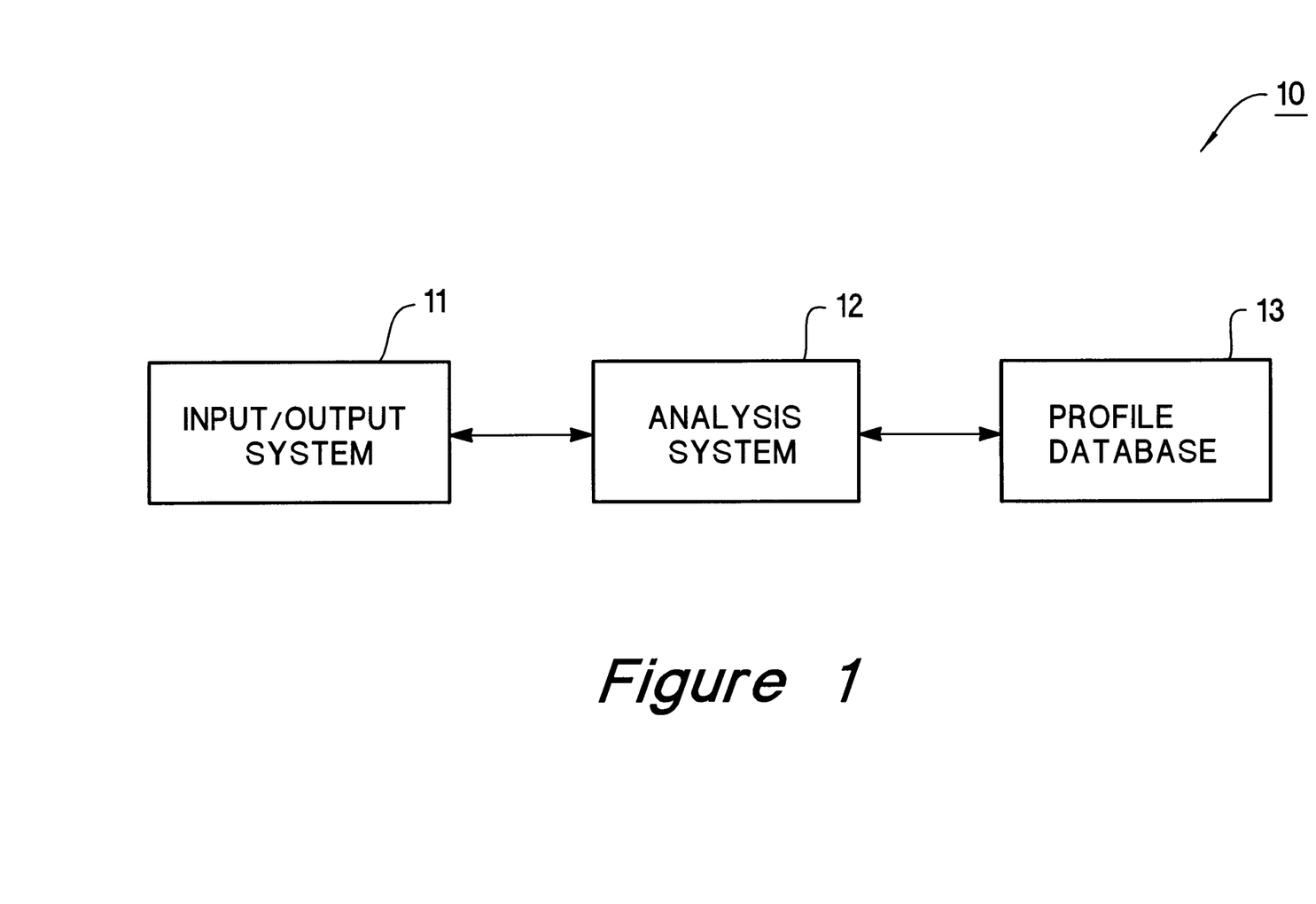
FIG. 1 shows the structure of a person identifier and management system that implements one embodiment of the present invention.

FIG. 1 shows a person identifier and management system 10 that implements one embodiment of the present invention. As will be described in more detail below, the person identifier and management system 10 allows a user to retrieve person-identifying or face-identifying information of a person from a profile database (or face image database) 13 of the person identifier and management system 10 based on the person's face inputted to the person identifier and management system 10 such that the person can be identified or recognized by the user of the person identifying system 10. This means that the person identifier and management system 10 can use the input face image to search the profile database 13 for matching face or faces and their associated face-identifying or person-identifying data so that the input face can be identified or recognized.

As will be described in more detail below, the person identifier and management system 10 includes the profile database 13. The profile database 13 stores a number of face images and their associated face-identifying or person-identifying data. The profile database 13 stores the pixel data of each of the face images. In addition, the profile database 13 also stores the face feature data of each of the face images. The face feature data of a face image is associated with that face image in the profile database 13. The person-identifying data of each of the face images is also associated with the respective face image in the profile database 13.

In addition to the profile database 13, the person identifier and management system 10 also includes an analysis system 12 that (1) detects if an input image of the person identifier and management system 10 contains a face image and (2) extracts the face feature data from the input image if the input image is detected to contain a face. The input image is supplied by an input/output system 11 connected to the analysis system 12. The input/output system 11 is also used for outputting the person-identifying data retrieved from the profile database 13.

The analysis system 12 accesses the profile database 13 with the extracted face feature data of the input face image to locate the matching face feature data in the profile database 13. When there is a match between the face feature data of the input face image and the face feature data of one or more stored face images, the person-identifying data of the matching face images are retrieved from the profile database 13. This allows the user of the person identifier and management system 10 to identify or recognize the input face image. The person identifier and management system 10 will be described in more detail below, also in conjunction with FIGS. 1–6.

FIG. 1 shows in block diagram form the structure of the person identifier and management system 10. The person identifier and management system 10 can be a single stand-alone device or implemented in a computer or computer-enabled system. If the person identifier and management system 10 is implemented in a computer system, the computer system can be a personal computer, a notebook computer, a mini-computer, a hand-held computer, a personal communicator, a workstation, a network computer, a server computer, or a mainframe computer.

As can be seen from FIG. 1, the person identifier and management system 10 includes the input/output system 11, the analysis system 12, and the profile database 13. The input/output system 11 is connected to the analysis system 12. The analysis system 12 is then connected to the profile database 13. The input/output system 11 is used provide the input and output functions for the person identifier and management system 10. The analysis system 12 is used to detect a face from an input image and to use the face feature data extracted from the input face image to search the profile database 13 in order to identify the input face image.

The profile database 13 stores a number of face images and their face feature data and person-identifying or face-identifying data. The face feature data and the person-identifying data are fully searchable in the database 13. The face feature data and its creation will be described in more detail below, also in conjunction with FIGS. 1 and 4. The person-identifying data can be a text data, an image data, and a combination of text and image data. The person-identifying data of a face image may include the name of the person, affiliation or employment of the person, and time and occasion of last meeting or all of the previous meetings with the person. The employment information may include name of the company the person is currently working for, the title and position of the person within the company. In addition, the person-identifying data may also include other information, such as telephone and fax numbers and/or e-mail address, the name of the third person who introduced the person, and/or other types of person-identifying information.

Figure 6:
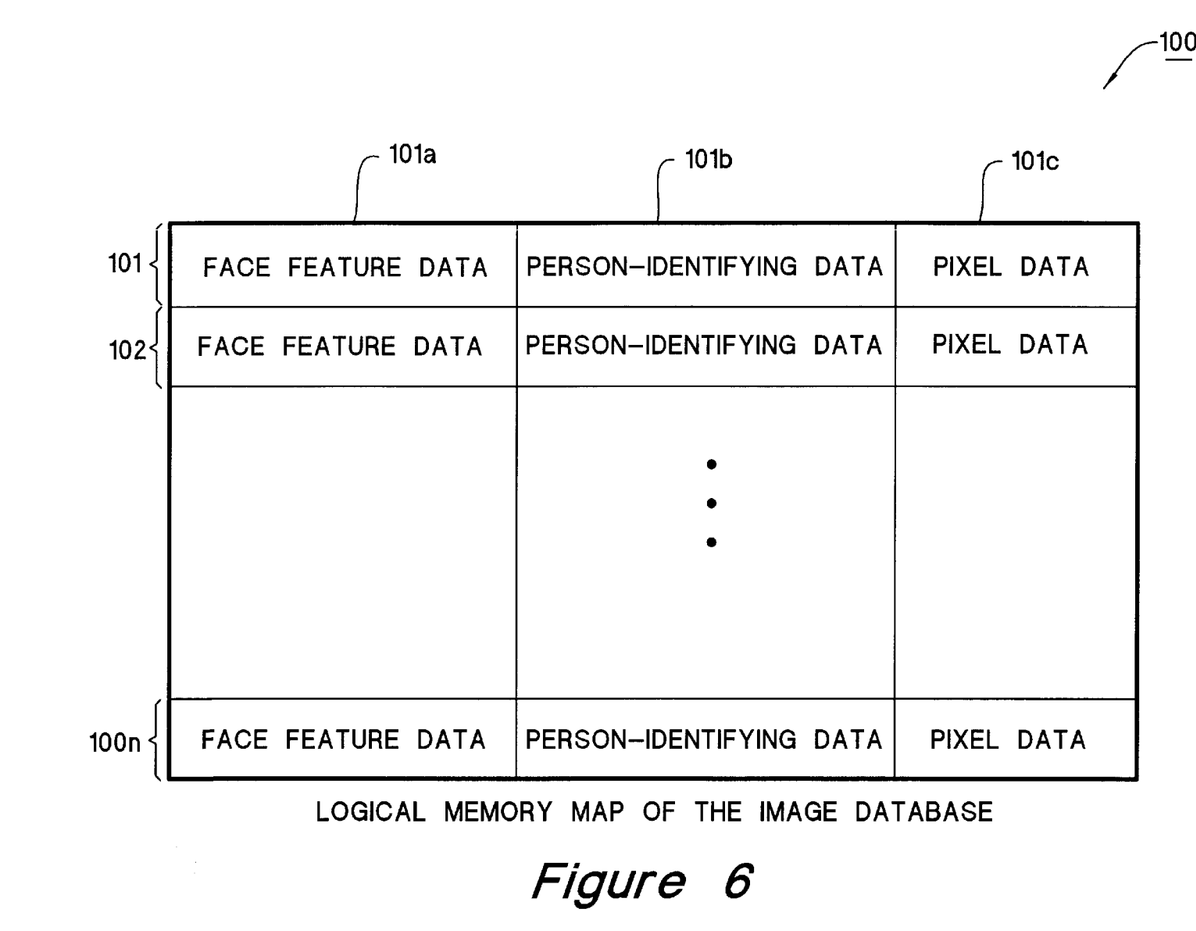
FIG. 6 shows the data format for each of the face images stored in the profile database of the person identifier and management system of FIG. 1.

Each of the digital face images stored in the profile database 13 is, for example, in the pixel matrix format. This means the profile database 13 stores the pixel data of each of the stored face images. In addition, the face feature data and the person-identifying data of each face image are associated with or linked to the respective face image stored in the profile database 13. The face feature data and the person-identifying data of a face image are, however, not necessarily physically stored adjacent to the respective face image in the profile database 13. The profile database 13 can be implemented and accessed using known database technologies. FIG. 6 shows the logical memory map 100 for the face images stored in the profile database 13.

As can be seen from FIG. 6, the logical memory map 100 of the profile database 13 of FIG. 1 includes a number of entries 101 through 100n, each for storing one digital face image. Each entry (e.g., the entry 101) includes a face feature data field (e.g., the face feature data field 101a), a person-identifying data field (e.g., the person-identifying data field 101b), and the image pixel data field (e.g., the pixel data field 101c). The pixel data field of each entry stores the pixel data (i.e., the image data) of a face image stored in the profile database 13. The face feature data field of each entry stores the face feature data of a face image stored in the database 13 and the person-identifying data field of each entry stores the person-identifying data of a face image stored into the database 13. The face feature data field of an entry is associated with or linked to the face image of that entry. The personidentifying data field of an entry is also associated with or linked to the face feature data of that entry.

Figure 5:
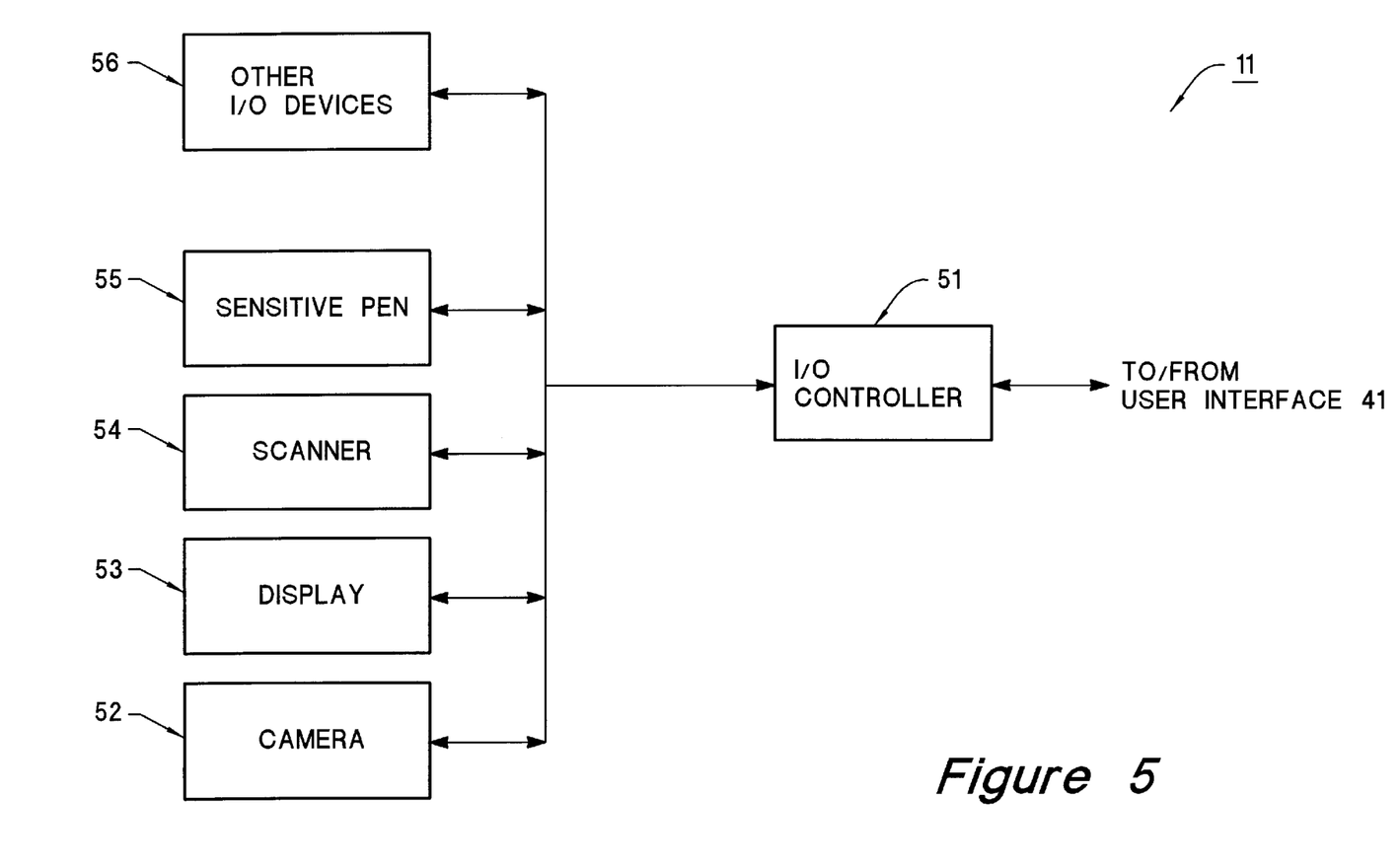
FIG. 5 shows the input/output system of the person identifier and management system of FIG. 1.

Referring back to FIG. 1, the input/output system 11 is used to input face images to the person identifier and management system 10. In addition, the input/output system 11 is also the output means of the person identifier and management system 10 for data output. For example, the input/output system 11 outputs the person-identifying data of a matching face stored in the person identifier and management system 10 by displaying or printing the person-identifying data. The input/output system 11 may include a number of input and output devices or modules. For example, the input/output system 11 may include a display that displays the input face image to be searched in the profile database 13 for matching faces. The display also displays any person-identifying data retrieved from the profile database 13. In addition, the input/output system 11 may also include a digital camera that captures the input face image. The digital camera may be replaced, for example, with a scanner. Moreover, the input/output system 11 may include a text input device (e.g., keyboard or touch sensitive screen with handwriting recognition capabilities) that allows input of text person-identifying data into the profile database 13. FIG. 5 shows one implementation of the input/output system 11 of FIG. 1, which will be described in more detail below.

As can be seen from FIG. 5, the input/output system 11 includes an I/O controller 51 connected to a number of I/O devices 52 through 56. The function of the I/O controller 51 is to control various input/output activities of the input/output system 11. The I/O controller 51 is implemented using known VO controller technologies.

The I/O devices 52-56 include a camera 52, a display 53, a scanner 54, a sensitive pen 55, and other I/O devices 56. The camera 52 can be any known digital camera. The display 53 can be any known computer or TV display. In one embodiment, the display 53 is a touch sensitive screen display that allows text and/or graphics input using a sensitive pen. In this case, the touch sensitive screen display may have an embedded keyboard or may have a handwriting recognition system. All of the I/O devices 52–55 can be implemented using known technologies.

The other I/O devices 56 may include a keyboard, a printer, and a modem or network adaptor for network communications. All the other I/O devices 56 are known I/O devices. Although FIG. 5 show I/O devices 52–56 for the input/output system 11, the input/output system 11 may include more or fewer than I/O devices 52–56. For example, the input/output system 11 may not include the scanner 54.

Referring back to FIG. 1, the analysis system 12 of the person identifier and management system 10 is used to detect the face from the input face image supplied from the input/output system 11. In addition, the analysis system 12 extracts face feature data from the detected face in the input face image. The analysis system 12 then uses the extracted face feature data to search the profile database 13 for matching face feature data stored. If matching face feature data is located in the profile database 13, then the analysis system 12 retrieves the person-identifying data associated with the matching face feature data stored in the profile database 13. When the user of the person identifier and management system 10 views the retrieved person-identifying data, the user is able to recognize or identify the input face image.

If no matching face feature data is found in the profile database 13, it means that none of the stored face images in the profile database 13 is similar to the input face image. In this case, the analysis system 12 makes such indication to the user. The user can then have the option of storing the input face image in the profile database 13, along with the associated face feature data and the person-identifying data. Before storing the input face image into the profile database 13, the analysis system 12 asks the user to input the person-identifying data of the input face image via the input/output system 11. The structure and function of the analysis system 12 will be described in more detail below, also in conjunction with FIG. 4.

Figure 4:
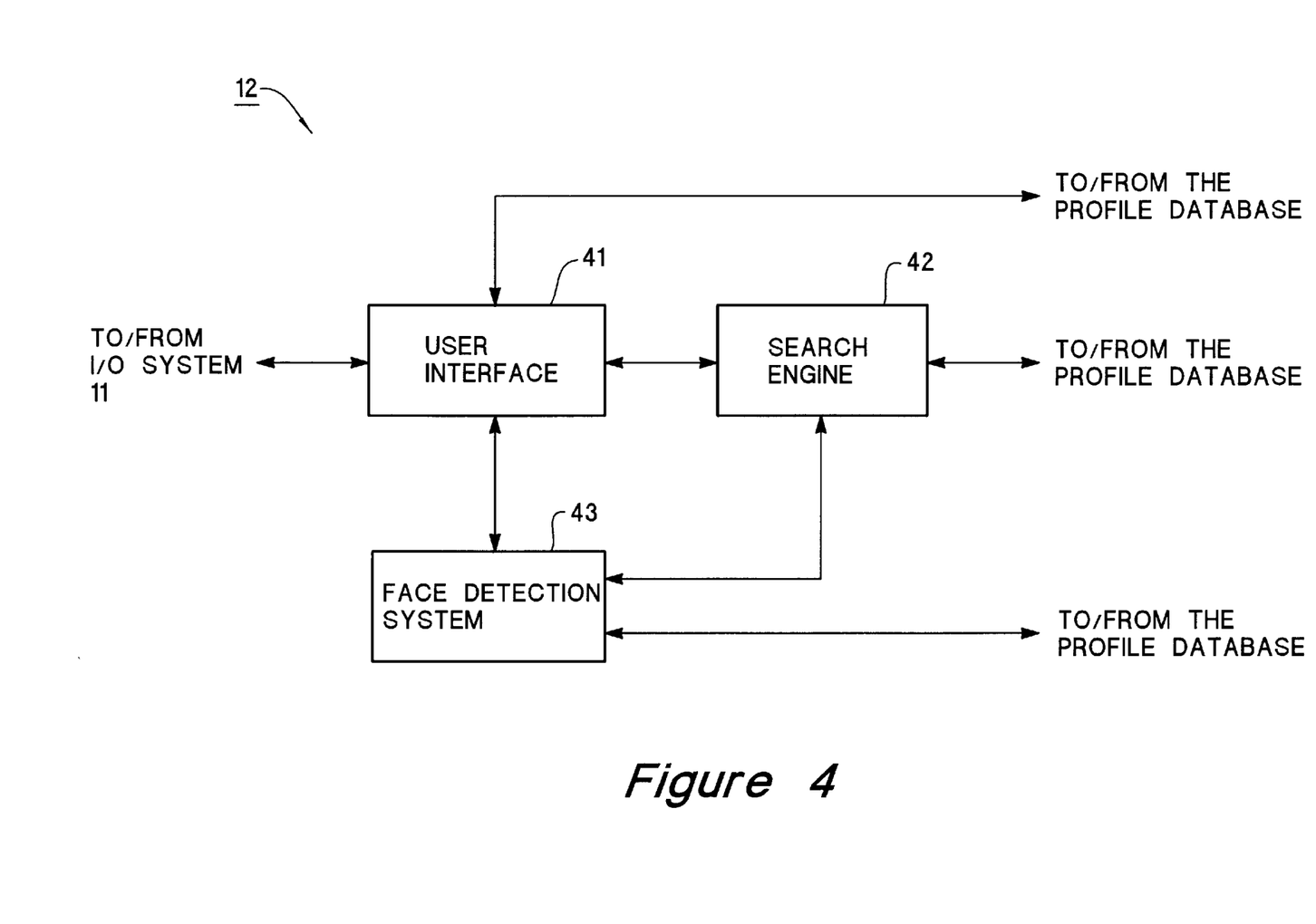
FIG. 4 shows the analysis system of the person identifier and management system of FIG. 1.

Referring to FIG. 4, the analysis system 12 includes a user interface 41, a search engine 42, and a face detection and feature extraction system 43. The user interface 41 is connected to the search engine 42 and the face detection and feature extraction system 43. The search engine 42 is also connected to the face detection and feature extraction system 43. Each of the components 41–43 is a functional module and can be implemented by software, hardware, and firmware.

The user interface 41 is an interactive user interface that is part of an interactive window interface. The user interface 41 includes a window (not shown) that displays the input face image and the retrieved person-identifying data. In addition, the user interface 41 also includes a number of command or function buttons that can be activated using a user input device (e.g., mouse or sensitive pen). The user interface 41 may also include a touch sensitive screen keyboard or a hand writing recognition system. The user interface 41 can be implemented using any known technology.

The face detection and feature extraction system 43 receives the input face image from the user interface 41. The face detection and feature extraction system 43 detects if the input face image contains any face. The detection system 43 also detects the eye locations of the face in the input face image. The system 43 then uses the eye location data to compute the face feature data of the detected face. The face feature data are also referred to as face coefficient data.

In one embodiment, the detection system 43 uses neural network-based face detection technology to detect the face in the input face image. The neural network-based face detection scheme is disclosed in a publication entitled HUMAN FACE DETECTION IN VISUAL SCENES, by H. Rowley (har@cs.cmu.edu), S. Baluja (baluja@cs.cmu.edu), and T. Kanade (tk@cs.cmu.edu) in November 1995. The publication is available from Carnegie Mellon University's Internet site at "www.ius.cs.cmu.edu/IUS/har2/har/www/CMU-CS-95-158R/." Alternatively, other known face detection technologies may be used. For example, a face detection scheme described in U.S. Pat. No. 5,164,992, dated Nov. 17, 1992, and entitled FACE RECOGNITION SYSTEM can be employed.

When the detection system 43 uses the neural network-based face detection scheme, the detection system 43 detects if the input face image contains any face by first applying a set of neural network-based filters to the image. The filters examine each location in the image at several scales, looking for locations that might contain a face (i.e., looking for eye locations). The detection system 43 then uses an arbitrator to combine the filter outputs. The arbitrator is used to merge detections from individual filters and eliminate overlapping detections. Using the neural network-based face detection technology makes the face detection robust, relatively fast, and detect most faces. In addition, it allows the detection system 43 to detect different kinds of faces with different poses and lightings.

Once a face is detected, the face detection and feature data extraction system 43 computes the face feature data of the detected face. In one embodiment, the face detection and feature extraction system 43 computes the face feature data of the detected face using a face feature extraction technology described in the above-mentioned U.S. Pat. No. 5,164,992. Alternatively, other known face feature extraction schemes may be used.

The face feature extraction process by the system 43 is done by first normalizing, warping (i.e., rotating and scaling), and masking the face to produce a reference face that has a set of predetermined eye locations. This means that through normalizing, warping, and masking of the detected face, the eyes of the detected face are mapped into the predetermined eye locations of the reference face. This is done by translating, scaling, and rotating the detected face and by adjusting the brightness and contrast of the detected face. In other words, this is to standardize or normalize the detected face. This is disclosed in the above-mentioned U.S. Pat. No. 5,164,992.

Then the system 43 projects the standardized face into an Eigen-face space to compute the face coefficients or face feature data of the detected face. This is also disclosed in the above-mentioned U.S. Pat. No. 5,164,992.

After the face detection and feature extraction system 43 extracts the face feature data, the extracted face feature data is then sent to the search engine 42. The search engine 42 then accesses the profile database 13 (FIG. 1) with the extracted face feature data. This is to find and locate any face feature data stored in the profile database 13 that matches or is similar to the extracted face feature data.

The search engine 42 uses the extracted face feature data to search for face images stored in the profile database 13 having similar face feature data. The search engine 42 compares the extracted face feature data with each stored face feature data to output similarity scores based on the predetermined similarity measure. In one embodiment, the similarity measure includes a set of thresholds and the face feature data includes a set of values. The comparison of the corresponding values of two face feature data yields differences between the values of the two data. The differences are then compared against their corresponding thresholds. A similarity score is obtained based on how many of the differences are less or more than the thresholds. The search engine 42 can be any kind of known search engine.

The search engine 42 then retrieves the person-identifying data associated with the matching face feature data (i.e., the similar faces) from the profile database 13. In one embodiment, the search engine 42 retrieves both the person-identifying data and the pixel data of the similar images for display after a search. In another embodiment, the search and engine 42 selectively retrieves the person-identifying data of the similar images in accordance with their similarity scores.

When there is no matching face feature data in the profile database 13 and the input face image is to be stored in the profile database 13, the face detection and feature extraction system 43 extracts the face feature data from the input face image and associates the face feature data with the input face image before storing the image and the face feature data into the profile database 13. In addition, the face detection and feature extraction system 43 receives the person-identifying data of the input face image from the user interface 41 before storing the pixel data and the face feature data of the input face image into the profile database 13. The person-identifying data of the input face image is also associated with the face feature data of the input face image in the profile database 13.

Figure 2:
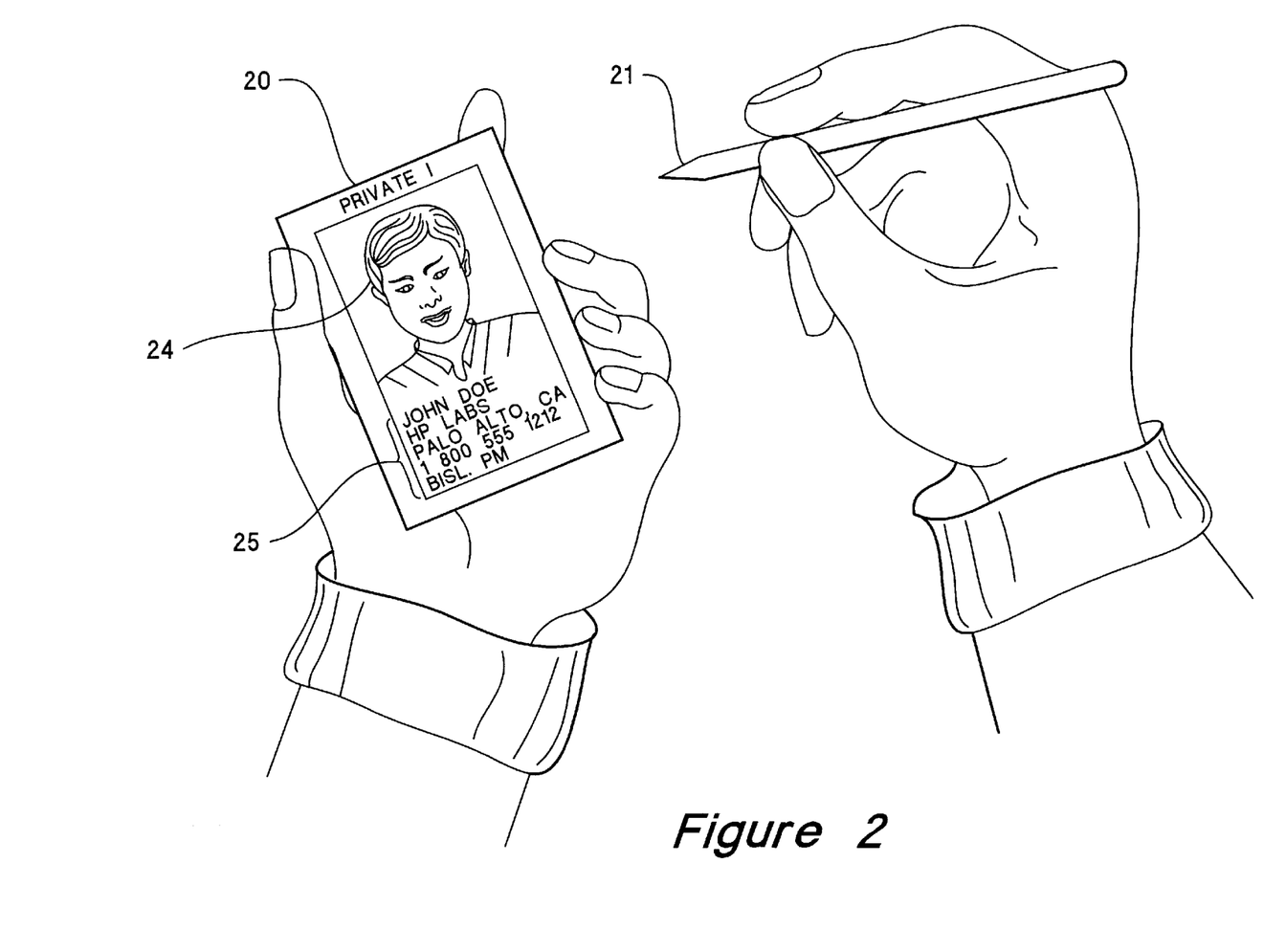
FIG. 2 illustrates the perspective view of the person identifier and management system of FIG. 1 as a portable, personal, and hand-held system in accordance with one embodiment of the present invention.
Figure 3A:
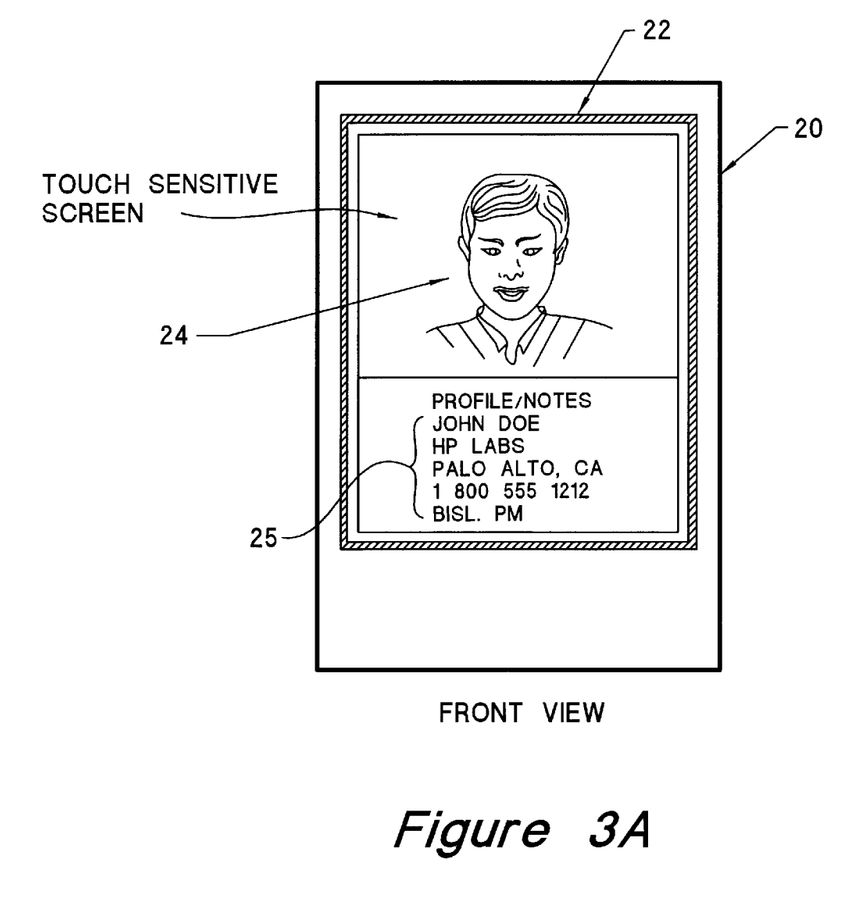
FIG. 3A is a front view of the personal person identifier and management system of FIG. 2.
Figure 3B:
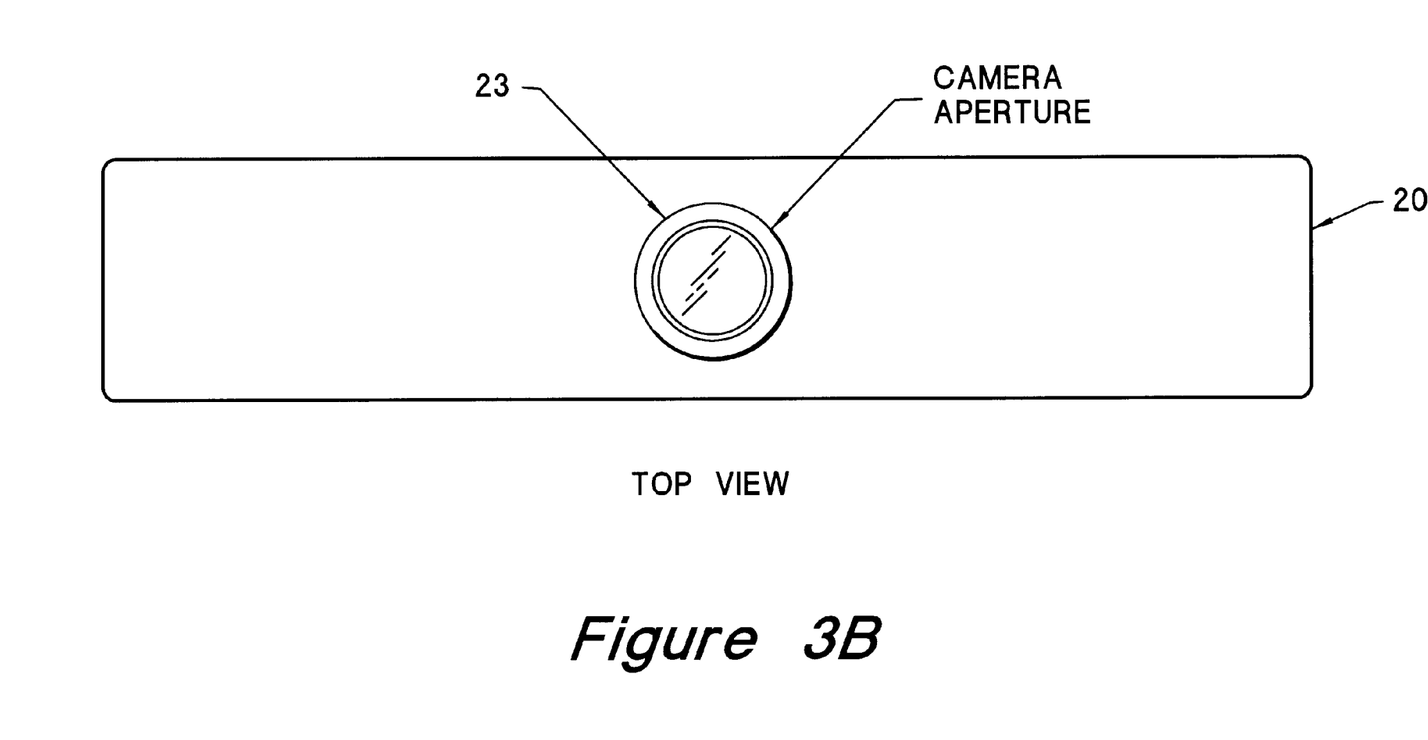
FIG. 3B shows the top view of the personal person identifier and management system of FIG. 2.

Referring back to FIG. 1, the person identifier and management system 10 can be a portable personal system that can be easily carried around by the user of the system 10. For example, the person identifier and management system 10 can be a hand-held personal system. Alternatively, the person identifier and management system 10 can also be a non-portable system. FIG. 2 is a perspective view of a hand-held portable personal person identifier and management system 20 that implements one embodiment of the person identifier and management system 10 of FIG. 1. FIGS. 3A and 3B show the front and top views of the hand-held portable personal person identifier and management system 20.

As can be seen from FIGS. 2 and 3A–3B, the hand-held portable personal person identifier and management system 20 includes a touch sensitive screen display 22 that allows display of the input face image 24 and the retrieved person-identifying data 25 and a digital camera 23 that is an integrated part in the hand-held portable personal person identifier and management system 20. The digital camera 23 is used to capture the input face image 24. In addition, the hand-held portable personal person identifier and management system 20 also include a writing tool 21 that allows input into the hand-held portable personal person identifier and management system 20 via the touch sensitive screen display 22.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A person identifier and management system, comprising:

(A) an image database that stores face feature data of each of a plurality of face images and person-identifying data associated with each of the face images, wherein the person-identifying data include name, affiliation, and time and occasion of meetings;

(B) an image capturing system that captures an input face image;

(C) a face analysis system coupled to the image capturing system and the image database to locate and retrieve the person-identifying data of any stored face image similar to the input face image from the image database;

(D) a display system that displays the input face image and the person-identifying data of the stored face image determined to be similar to the input face image by the face analysis system, wherein the person identifier and management system is a single stand-alone hand held device that fits into a user's single hand, wherein the image database, the image capturing system, the display system, and the face analysis system all physically reside in the single stand-alone portable hand held device.

2. The person identifier and management system of claim 1, wherein the face analysis system locates and retrieves the person-identifying data from the image database by extracting the feature data of the input face image and comparing the face feature data of the input face image with that of each of the face images stored in the face image database.

3. The person identifier and management system of claim 1, wherein the face analysis system further comprises
   (I) a face detection and feature extraction system that detects the input face image and extracts the face feature data from the input face image;
   (II) a search engine that compares the face feature data of the input face image with that of the face images stored in the image database.

4. The person identifier and management system of claim 3, wherein the face analysis system further comprises a user interface that allows the input face image and the person-identifying data to be displayed on a display and that allows a user to input and associate the person-identifying data with a face image displayed.

5. The person identifier and management system of claim 1, wherein the image capturing system is an integrated digital camera.

6. The person identifier and management system of claim 1, further comprising a display that displays the person-identifying data along with the input face image.

7. The person identifier and management system of claim 6, wherein the display is a touch screen display that also allows input of the person-identifying data into the face image database.

* * * * *